United States Patent
Foster et al.

(10) Patent No.: US 6,912,625 B2
(45) Date of Patent: Jun. 28, 2005

(54) METHOD, SYSTEM, AND COMPUTER PROGRAM PRODUCT FOR CREATING AND MANAGING MEMORY AFFINITY IN LOGICALLY PARTITIONED DATA PROCESSING SYSTEMS

(75) Inventors: Robert Kimberlin Foster, Austin, TX (US); Van Hoa Lee, Cedar Park, TX (US); Casey Lee McCreary, Liberty Hill, TX (US); Priya Paul, Round Rock, TX (US); Natalie Marie Post, Austin, TX (US); Quan Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 10/339,774

(22) Filed: Jan. 9, 2003

(65) Prior Publication Data

US 2004/0139287 A1 Jul. 15, 2004

(51) Int. Cl.7 .............................................. G06F 12/00
(52) U.S. Cl. ....................................... 711/153; 711/173
(58) Field of Search .................................. 711/153, 173

(56) References Cited

U.S. PATENT DOCUMENTS

| | | | | |
|---|---|---|---|---|
| 5,155,803 A | * | 10/1992 | Barabash et al. | 706/48 |
| 6,625,638 B1 | * | 9/2003 | Kubala et al. | 718/105 |
| 2002/0129127 A1 | * | 9/2002 | Romero et al. | 709/220 |

* cited by examiner

*Primary Examiner*—Matthew D. Anderson
(74) *Attorney, Agent, or Firm*—Duke W. Yee; Mark E. McBurney; Stephen R. Tkacs

(57) ABSTRACT

A method, system, and product are described for creating and managing affinity between memory and processors in logical partitions in a data processing system. The data processing system includes multiple processors. A memory affinity data structure is established. The memory affinity data structure identifies ones of the processors that have a close affinity with each one of multiple regions of the system memory. A memory affinity parameter is established and is utilized to determine whether memory affinity is required for each one of the logical partitions. In response to a determination that memory affinity is required for one of the logical partitions, the memory affinity data structure is utilized by a partition manager for the logical partition to allocate an optimal amount of memory that has a close affinity to ones of the processors that are assigned to the logical partition.

24 Claims, 5 Drawing Sheets

METHOD, SYSTEM, AND COMPUTER PROGRAM PRODUCT FOR CREATING AND MANAGING MEMORY AFFINITY IN LOGICALLY PARTITIONED DATA PROCESSING SYSTEMS

BACKGROUND OF THE INVENTION

1. Technical Field

The present invention relates generally to the field of computer systems and, more specifically, to a method, system, and computer program product for creating and managing memory affinity in logically partitioned data processing systems.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

Affinity is the proximity connection between the memory sub-system and the processors. Memory affinity effects the latency between system memory and processors. System memory latency may be different depending upon which processor is accessing the memory. Thus, for a particular region of memory, the latency when a first processor is accessing the region may be small, while the latency for that same region may be large when a second processor is accessing the region. The latency may also vary depending upon which region of memory is being accessed. The latency when a first region of system memory is accessed by a particular processor may be small while the latency is large when that particular processor is accessing a second region of system memory.

Therefore, a need exists for a method, system, and computer program product for creating and managing memory affinity in a logically partitioned data processing system such that regions of system memory are allocated to a particular logical partition where the allocated regions of system memory have a close affinity to the processors that are assigned to that particular logical partition.

SUMMARY OF THE INVENTION

A method, system, and computer program product are described for creating and managing affinity between memory and processors in logical partitions in a data processing system. The data processing system includes multiple processors. A memory affinity data structure is established. The memory affinity data structure identifies ones of the processors that have a close affinity with each one of multiple regions of the system memory. A memory affinity parameter is established and is utilized to determine whether memory affinity is required for each one of the logical partitions. In response to a determination that memory affinity is required for one of the logical partitions, the memory affinity data structure is utilized by a partition manager for the logical partition to optimally allocate memory that has a close affinity to ones of the processors that are assigned to the logical partition.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
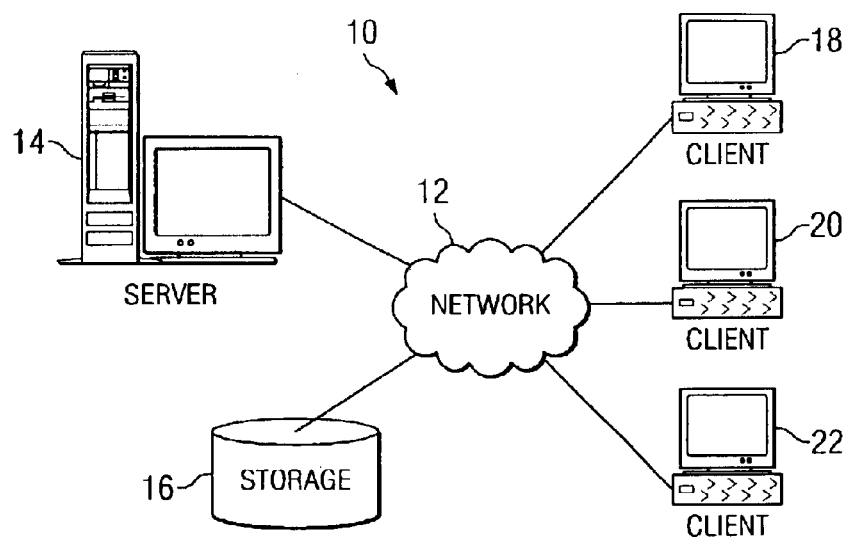
FIG. 1 depicts a pictorial representation of a network of data processing systems in which the present invention may be implemented.

A preferred embodiment of the present invention and its advantages are better understood by referring to the figures, like numerals being used for like and corresponding parts of the accompanying figures.

The present invention is a method, system, and computer program product for creating and managing affinity between system memory and processors in logical partitions in a data processing system. Resources, such as processors, are assigned to the logical partitions.

When regions of the system memory are allocated for a logical partition, the partition manager determines whether memory affinity is required. If memory affinity is required, the partition manager uses memory affinity data structures to locate regions of system memory that have a close affinity to the processors that are assigned to a logical partition. In other words, the memory affinity data structures identify processors that have a minimum latency with respect to a particular memory range. The partition manager then allocates regions of memory to this logical partition from a pool that includes only that free memory that has a close affinity to the processors of this logical partition.

A memory affinity data structure is created for each region of memory. This data structure identifies the processors that have a close memory affinity for a particular region of memory. For example, the following is an example of a data structure that may be used to implement the memory affinity data structure for each region of memory:

```
struct_mem_affinity {
    unsigned long start_addr;      /*64-bit beginning
address of this memory address range */
    unsigned long length;          /*size of this memory
address range */
    unsigned long procs_mask;      /* bit(x)=1 means the
processor with ID=x has minimum latency with respect to
this memory range and is thus defined as having a "close
affinity" */
}
```

The memory affinity data structures will identify all processors that are defined as having a close affinity to a region of memory. A processor will be defined as having a "close" affinity to a particular region of memory when the processor is identified within the memory affinity data structure that is associated with that region of memory. A memory affinity data structure will exist for each region of memory.

The present invention includes a hardware management console (HMC). The HMC manages the logical partitions through a set of non-volatile random access memory (NVRAM LPAR) system resource tables. Through a system mode field that is included in the system resource tables, the HMC can control the data processing system to run in either symmetric multiprocessing (SMP) mode or logically partitioned (LPAR) mode. The HMC may start a partition, when in LPAR mode, by first assigning to the partition processors in the processor system resource table and I/O device slots in the I/O table. The HMC also specifies, within the command/status resource table, the amount of system memory to be allocated to this partition. The HMC then writes a boot command to the partition's NVRAM structure in the command/status resource table.

A new byte-field, called a partition type parameter, is added to the partition's NVRAM structure. A different partition type parameter exists for each partition within a partition's NVRAM structure. A user may specify a particular type of affinity. The partition type parameter is then set, according to the particular type of affinity specified by the user, by the HMC before a boot command is written to a partition's NVRAM structure. In the preferred embodiment, there are three defined values:

0x01: The partition requires no system memory allocation with affinity. Any free memory may be allocated to satisfy the partition's memory requirement.

0x02: This value specifies a four-way partition that requires system memory allocation with affinity.

0x03: This value specifies an eight-way partition that requires system memory allocation with affinity.

A new byte-field, partition mode parameter, is also added to the system resource table. This field is initialized by the service processor to 0x00 when the data processing system is powered-on. The partition manager will update the partition mode parameter by copying the current value of the partition type parameter upon instantiating the first partition. The partition type field specifies by the HMC which memory allocation scheme should be used by the partition manager when instantiating all partitions.

A list of supported configurations is maintained within the partition manager. When a partition manager sees a boot command in a partition, the partition manager reads the partition type parameter of the partition, and copies the value to the partition mode parameter if this is the first partition to be instantiated. Otherwise, the partition manager reads the current value of the partition mode field when the partition manager sees a boot command.

The partition manager uses the partition mode field to determine the current configuration of the data processing system and checks the list of supported configurations to determine if the current configuration is supported. If the current configuration is supported and requires memory affinity, the partition manager allocates to a partition only that memory that has a close affinity to the processors of the partition.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18–22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
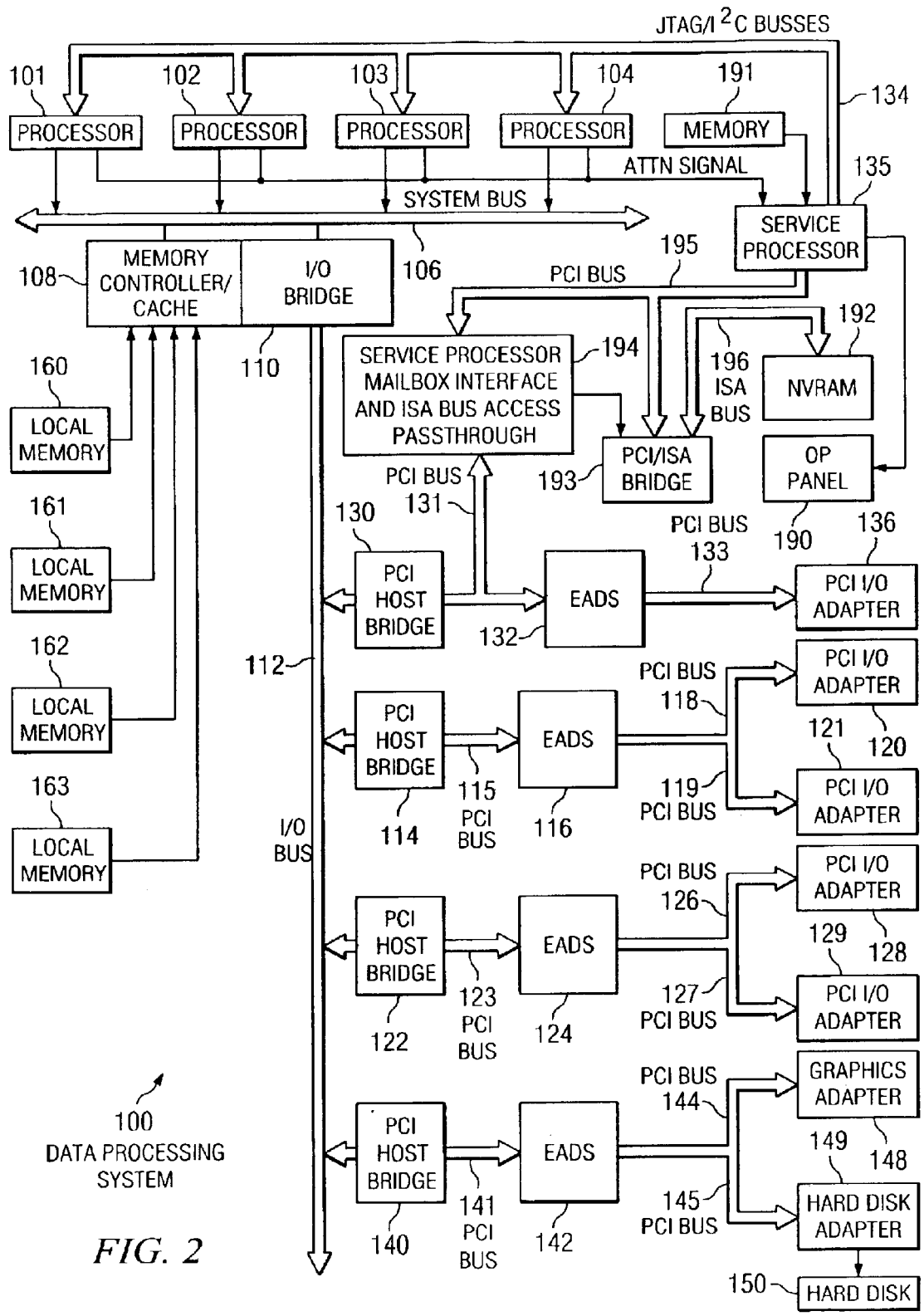
FIG. 2 illustrates a block diagram of a data processing system in which the present invention may be implemented in accordance with the present invention.

FIG. 2 illustrates a block diagram of a data processing system in which the present invention may be implemented in accordance with the present invention. Data processing system 100 includes a plurality of processors 101, 102, 103, and 104 connected to system bus 106. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–164 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI—PCI bridge) via PCI buses 141 and 144 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NVRAM storage is connected to the ISA bus 196. The service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
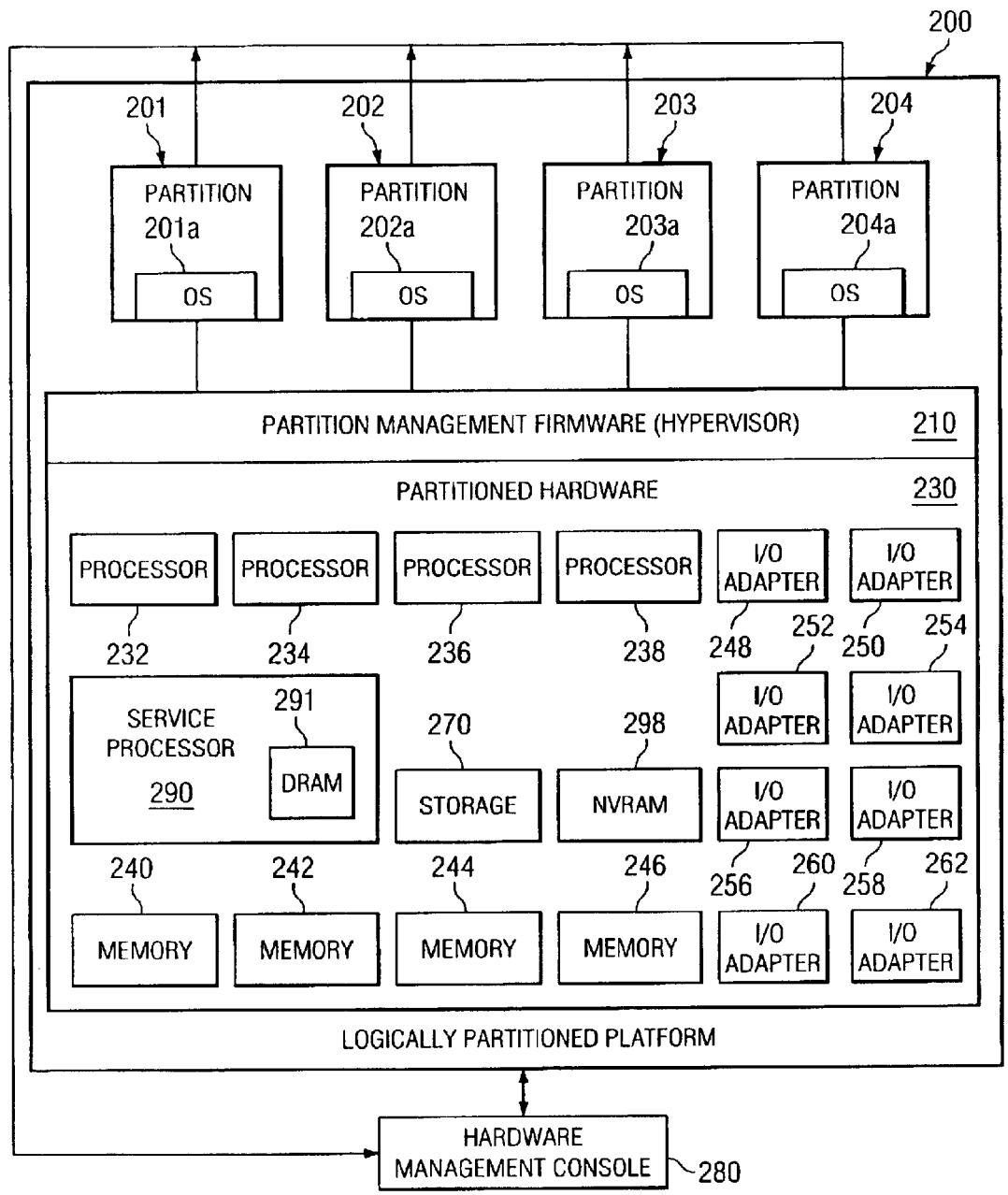
FIG. 3 depicts a block diagram of an exemplary logically partitioned platform in accordance with the present invention.

FIG. 3 illustrates a block diagram of an exemplary logically partitioned platform in accordance with the present invention. Logically partitioned platform 200 includes partitioned hardware (also called the base hardware) 230, partition management firmware, also called a hypervisor 210, and partitions 201–204. Operating systems 201a–204a exist within partitions 201–204. Operating systems 201a–204a may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NVRAM storage 298, and I/O adapters 248–262 may be assigned to one of multiple partitions 201–204.

Partitioned hardware 230 also includes service processor 290. A non-volatile memory device 291, such as a DRAM device, is included within service processor 291. The partition tables and firmware images described herein, as well as other information, are stored within service processor memory 291.

Partition management firmware (hypervisor) 210 performs a number of functions and services for partitions 201–203 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a–204a by virtualizing all the hardware resources of logically partitioned platform 200. Hypervisor 210 may attach I/O devices through I/O adapters 248–262 to single virtual machines in an exclusive mode for use by one of OS images 201a–204a.

A hardware management console (HMC) 280 may be coupled to data processing system 100 which includes logically partitioned platform 200. HMC 280 is a separate computer system that is coupled to logically partitioned platform 200 and may be used by a user to control various functions of data processing system 100. HMC 280 includes a graphical user interface (GUI) which may be used by a user to select a partition to be rebooted.

The Partition Manager is a component of Hypervisor 210 which specifically handles the instantiation and termination of partitions. During instantiation, the partition manager allocates resources to the starting partitions. During termination, the partition manager reclaims resources from the terminating partitions.

Figure 4:
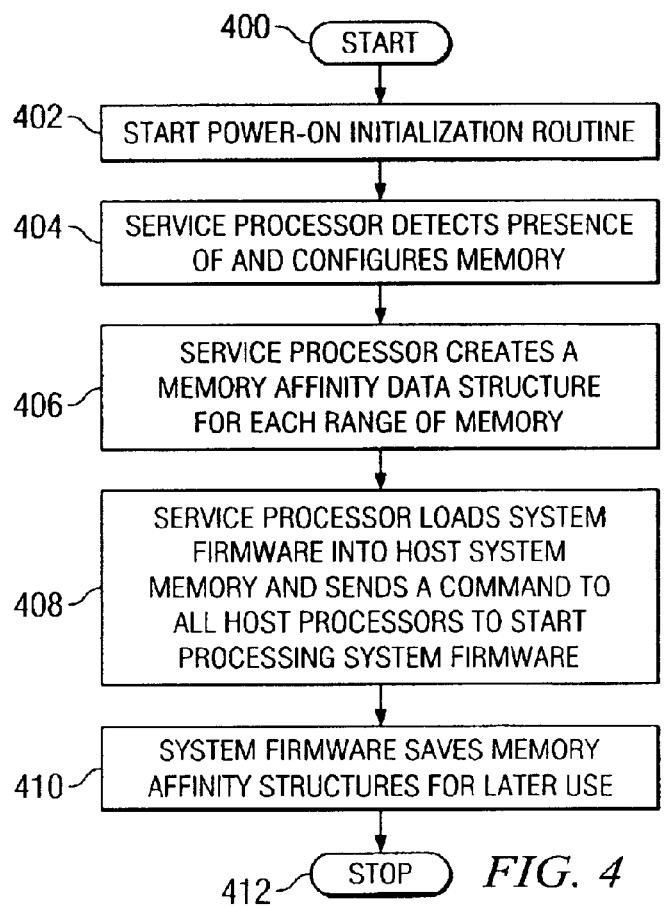
FIG. 4 illustrates a high level flow chart which depicts establishing memory affinity data structures for the system memory of a logically partitioned data processing system in accordance with the present invention.

FIG. 4 depicts a high level flow chart which illustrates establishing memory affinity data structures for regions of the system memory of a logically partitioned data processing system in accordance with the present invention. The process starts as depicted by block 400 and thereafter passes to block 402 which illustrates starting a power-on initialization routine within the data processing system. Next, block 404 depicts the service processor detecting a presence of the host's system memory. The service processor then configures the system memory. Block 406, then, illustrates the service processor creating a memory affinity data structure for each region of memory. A region of memory is defined by a range of addresses that are included within the region.

The process then passes to block 408 which depicts the service processor loading the system firmware into the host's system memory. The service processor also sends a command to all of the host's processors of the system to start processing the system firmware. Next, block 410 illustrates the system firmware saving the memory affinity structures for later use. The process then terminates as depicted by block 412.

Figure 5A:
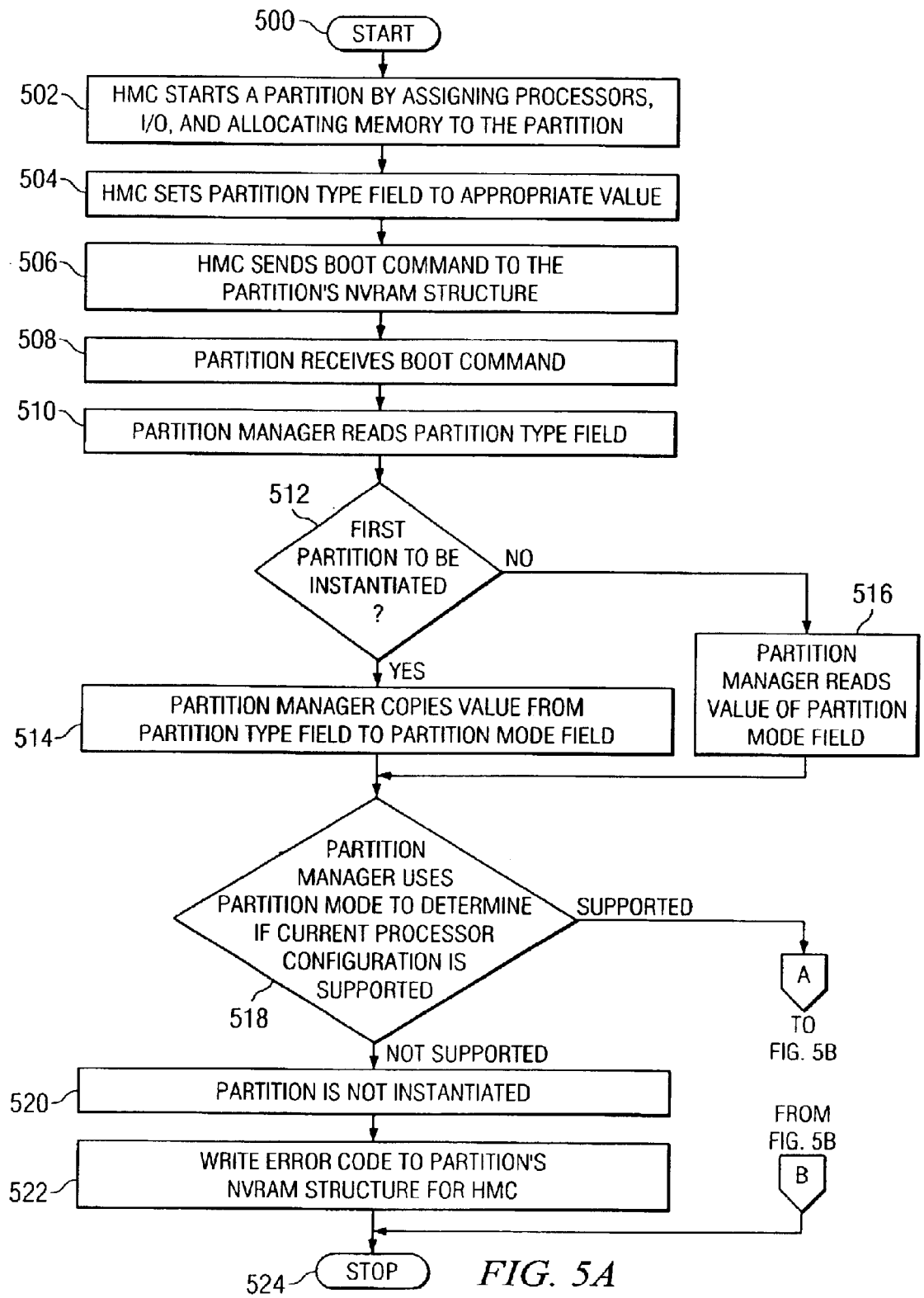
FIGS. 5A and 5B depict a high level flow chart which illustrates allocating regions of system memory while adhering to memory affinity requirements in accordance with the present invention.
Figure 5B:
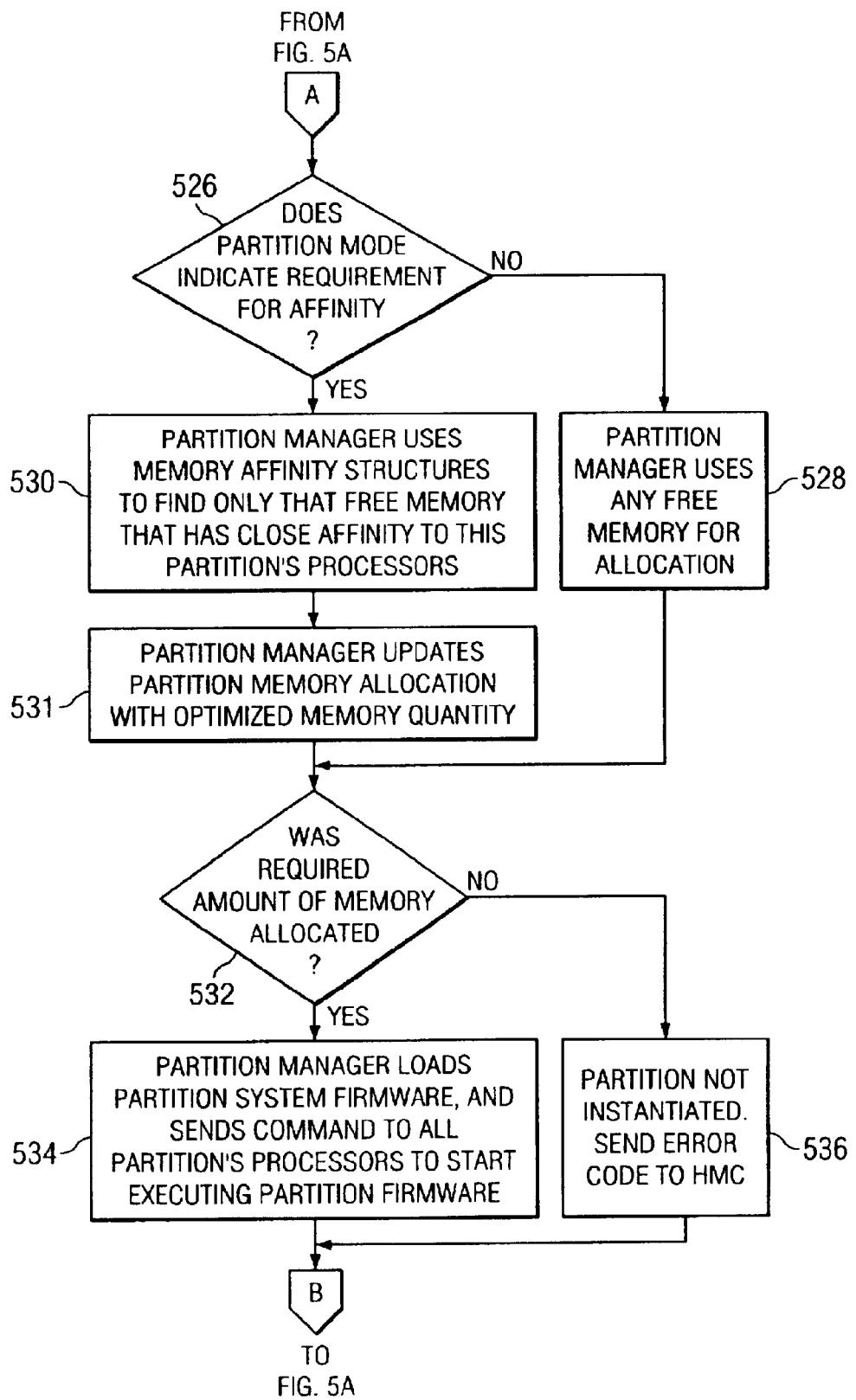

FIGS. 5A and 5B illustrate a high level flow chart which depicts allocating memory while adhering to memory affinity requirements in accordance with the present invention. The process starts as illustrated by block 500 and thereafter passes to block 502 which depicts the HMC starting a partition by assigning processors and I/O to the partition. The HMC also allocates memory to the partition. Next, block 504 illustrates the HMC setting the partition type parameter to the appropriate value that indicates the type of memory affinity that will be required by this data processing system.

The process then passes to block 506 which depicts the HMC sending a boot command to the partition's NVRAM structure. Thereafter, block 508 illustrates the partition receiving the boot command. Next, block 510 depicts the partition manager reading the partition type field.

Block 512, then, illustrates a determination of whether or not this is the first partition within the data processing system to be instantiated after a power-on routine has been executed. If a determination is made that this is the first partition within the data processing system to be instantiated, the process passes to block 514 which depicts the partition manager copying the value of the partition type parameter into the partition mode parameter. The process then passes to block 518.

Referring again to block 512, if a determination is made that this is not the first partition within the data processing system to be instantiated, the process passes to block 516 which depicts the partition manager reading the value of the partition mode parameter. The process then passes to block 518.

Block 518, then, illustrates a determination made by the partition manager using the partition mode parameter of whether or not the current processor configuration is supported. If a determination is made that the current processor configuration is not supported, the processor passes to block 520 which depicts the partition not being instantiated. Next, block 522 illustrates writing an error code to the partition's NVRAM structure for use by the HMC. The process then terminates as depicted by block 524.

Referring again to block 518, if a determination is made that the current processor configuration is supported, the process passes to block 526 which illustrates a determination of whether or not the partition mode parameter indicates a requirement for memory affinity. If a determination is made that the partition mode indicates no memory affinity is required, the process passes to block 528 which depicts the partition manager using any free memory for allocating memory to this partition. The process then passes to block 532.

Referring again to block 526, if a determination is made that the partition mode parameter indicates a requirement for memory affinity, the process passes to block 530 which illustrates the partition manager using the memory affinity data structures to find only that free memory that has close affinity to this partition's processors. The process then passes to block 531 which depicts the partition manager updating the partition memory allocation with an optimized memory quantity since the partition manager knows exactly what the optimal amount is of affinity memory of the current configuration of the partition. Block 531 depicts the partition manager modifying the memory allocation of the partition in the NVRAM table to this optimal amount so that the partition will have allocated to it an optimized amount of affinity memory. The process then passes to block 532.

Block 532, then, depicts a determination of whether or not the required amount of memory was allocated. If a determination is made that the required amount of memory was allocated, the process passes to block 534 which illustrates the partition manager loading partition system firmware and sending a command to all of the partition's processors to start executing partition firmware. The process then terminates as depicted by block 524.

Referring again to block 532, if a determination is made that the required amount of memory was not allocated, the process passes to block 536 which illustrates the partition not being instantiated. An error code is then sent to the HMC. The process then terminates as depicted by block 524.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for creating and managing affinity between memory and processors in logical partitions in a data processing system, said data processing system including a plurality of processors and system memory, said method comprising the steps of:

assigning ones of said plurality of processors to a particular one of said logical partitions;

allocating regions of said system memory to said particular one of said logical partitions; and said allocated regions of said system memory having a close affinity to said ones of said plurality of processors, wherein a given region of said system memory has a close affinity if a latency between said plurality of processors and the given region of said system memory is a minimum value.

2. The method according to claim 1, further comprising the steps of:

establishing a memory affinity data structure for each one of a plurality of regions of said system memory;

including an identification of particular ones of said plurality of processors in each memory affinity data structure, wherein said particular ones of said plurality of processors that are identified by each memory affinity data structure are defined as having a close affinity with one of said plurality of regions of system memory for which said memory affinity data structure is established.

3. The method according to claim 2, further comprising the steps of:

determining said ones of said plurality of processors that are assigned to said particular one of said logical partitions; and determining said regions of said system memory having a close affinity to said determined ones of said plurality of processors utilizing said memory affinity data structures for each region of said system memory.

4. The method according to claim 3, wherein the step of determining said regions of said system memory further comprises the step of:

determining said regions of said system memory that include an identification of said ones of said plurality of processors that are assigned to said particular one of said logical partitions.

5. The method according to claim 1, further comprising the steps of:

establishing a memory affinity parameter;

utilizing said memory affinity parameter to determine whether memory affinity is required for said one of said logical partitions; and in response to a determination that memory affinity is required for said one of said logical partitions, utilizing said memory affinity parameter by said one of said logical partition to allocate system memory that has a close affinity to ones of said plurality of processors that are assigned to said one of said logical partitions.

6. The method according to claim 5, further comprising the steps of:

specifying a list of supported system configurations;

utilizing said memory affinity parameter to determine a current system configuration; and determining, utilizing said memory affinity parameter and said list of supported system configurations, whether said current system configuration is supported.

7. The method according to claim 5, further comprising the steps of:

in response to booting a partition, determining whether this is the first partition to be booted;

in response to a determination that this is the first partition to be booted, copying a value of a partition parameter to said memory affinity parameter.

8. The method according to claim 1, further comprising the steps of:

establishing a memory affinity parameter;

utilizing said memory affinity parameter to determine whether memory affinity is required for said one of said logical partitions; and in response to a determination that memory affinity is required for said one of said logical partitions, utilizing said memory affinity parameter by said one of said logical partition to allocate an optimal amount of said system memory that has a close affinity to ones of said plurality of processors that are assigned to said one of said logical partitions.

9. A data processing system for creating and managing affinity between memory and processors in logical partitions in said data processing system, said data processing system including a plurality of processors and system memory, said system comprising:

assigning means for assigning ones of said plurality of processors to a particular one of said logical partitions;

allocating means for allocating regions of said system memory to said particular one of said logical partitions; and said allocated regions of said system memory having a close affinity to said ones of said plurality of processors, wherein a given region of said system memory has a close affinity if a latency between said plurality of processors and the given region of said system memory is a minimum value.

10. The system according to claim 9, further comprising:

a memory affinity data structure for each one of a plurality of regions of said system memory;

an identification of particular ones of said plurality of processors included in each memory affinity data structure, wherein said particular ones of said plurality of processors that are identified by each memory affinity data structure are defined as having a close affinity with one of said plurality of regions of system memory for which said memory affinity data structure is established.

11. The system according to claim 10, further comprising:

determining means for determining said ones of said plurality of processors that are assigned to said particular one of said logical partitions; and determining means for determining said regions of said system memory having a close affinity to said determined ones of said plurality of processors utilizing said memory affinity data structures for each region of said system memory.

12. The system according to claim 11, wherein said determining means for determining said regions of said system memory further comprises:

determining means for determining said regions of said system memory that include an identification of said ones of said plurality of processors that are assigned to said particular one of said logical partitions.

13. The system according to claim 9, further comprising:

a memory affinity parameter;

utilizing means for utilizing said memory affinity parameter to determine whether memory affinity is required for said one of said logical partitions; and in response to a determination that memory affinity is required for said one of said logical partitions, utilizing means for utilizing said memory affinity parameter by said one of said logical partition to allocate system memory that has a close affinity to ones of said plurality of processors that are assigned to said one of said logical partitions.

14. The system according to claim 13, further comprising:

a list of supported system configurations;

utilizing means for utilizing said memory affinity parameter to determine a current system configuration; and determining means for determining, utilizing said memory affinity parameter and said list of supported system configurations, whether said current system configuration is supported.

15. The system according to claim 13, further comprising:

in response to booting a partition, determining means for determining whether this is the first partition to be booted;

in response to a determination that this is the first partition to be booted, copying means for copying a value of a partition parameter to said memory affinity parameter.

16. The system according to claim 9, further comprising:

a memory affinity parameter;

utilizing means for utilizing said memory affinity parameter to determine whether memory affinity is required for said one of said logical partitions; and in response to a determination that memory affinity is required for said one of said logical partitions, utilizing means for utilizing said memory affinity parameter by said one of said logical partition to allocate an optimal amount of said system memory that has a close affinity to ones of said plurality of processors that are assigned to said one of said logical partitions.

17. A computer program product for creating and managing affinity between memory and processors in logical partitions in a data processing system, said data processing system including a plurality of processors and system memory, said product comprising:

instruction means for assigning ones of said plurality of processors to a particular one of said logical partitions;

instruction means for allocating regions of said system memory to said particular one of said logical partitions; and said allocated regions of said system memory having a close affinity to said ones of said plurality of processors, wherein a given reason of said system memory has a close affinity if a latency between said plurality of processors and the given region of said system memory is a minimum value.

18. The product according to claim 17, further comprising:

instruction means for establishing a memory affinity data structure for each one of a plurality of regions of said system memory;

instruction means for including an identification of particular ones of said plurality of processors in each memory affinity data structure, wherein said particular ones of said plurality of processors that are identified by each memory affinity data structure are defined as having a close affinity with one of said plurality of regions of system memory for which said memory affinity data structure is established.

19. The product according to claim 18, further comprising:

instruction means for determining said ones of said plurality of processors that are assigned to said particular one of said logical partitions; and instruction means for determining said regions of said system memory having a close affinity to said determined ones of said plurality of processors utilizing said memory affinity data structures for each region of said system memory.

20. The product according to claim 19, wherein said instruction means for determining said regions of said system memory further comprises:

instruction means for determining said regions of said system memory that include an identification of said ones of said plurality of processors that are assigned to said particular one of said logical partitions.

21. The product according to claim 17, further comprising:

instruction means for establishing a memory affinity parameter;

instruction means for utilizing said memory affinity parameter to determine whether memory affinity is required for said one of said logical partitions; and in response to a determination that memory affinity is required for said one of said logical partitions, instruction means for utilizing said memory affinity parameter by said one of said logical partition to allocate system memory that has a close affinity to ones of said plurality of processors that are assigned to said one of said logical partitions.

22. The product according to claim 21, further comprising:

instruction means for specifying a list of supported system configurations;

instruction means for utilizing said memory affinity parameter to determine a current system configuration; and instruction means for determining, utilizing said memory affinity parameter and said list of supported system configurations, whether said current system configuration is supported.

23. The product according to claim 21, further comprising:

in response to booting a partition, instruction means for determining whether this is the first partition to be booted;

in response to a determination that this is the first partition to be booted, instruction means for copying a value of a partition parameter to said memory affinity parameter.

24. The product according to claim 17, further comprising:

instruction means for establishing a memory affinity parameter;

instruction means for utilizing said memory affinity parameter to determine whether memory affinity is required for said one of said logical partitions; and in response to a determination that memory affinity is required for said one of said logical partitions, instruction means for utilizing said memory affinity parameter by said one of said logical partition to allocate an optimal amount of said system memory that has a close affinity to ones of said plurality of processors that are assigned to said one of said logical partitions.

* * * * *